United States Patent [19]

Mills et al.

[11] 4,237,533
[45] Dec. 2, 1980

[54] PREVENTING INITIAL PROGRAM LOAD FAILURES

[75] Inventors: Phillip R. Mills, Gilroy; Fernando A. Luiz, Monte Sereno; John H. Sorg, Jr., Los Gatos, all of Calif.

[73] Assignee: International Business Machines Corporation, Armonk, N.Y.

[21] Appl. No.: 973,992

[22] Filed: Dec. 28, 1978

[51] Int. Cl.³ .............................................. G06F 3/00
[52] U.S. Cl. ..................................................... 364/200
[58] Field of Search ... 364/200 MS File, 900 MS File, 364/200; 235/302.2

[56] References Cited

U.S. PATENT DOCUMENTS

| | | | |
|---|---|---|---|
| 3,716,837 | 2/1973 | Waddell | 364/200 |
| 3,840,864 | 10/1974 | Chang et al. | 364/200 |
| 3,911,400 | 10/1975 | Levy et al. | 364/200 |
| 4,030,073 | 6/1977 | Armstrong, Jr. | 364/200 |
| 4,040,021 | 8/1977 | Birchall et al. | 364/200 |
| 4,079,448 | 3/1978 | N'Guyen et al. | 364/200 |
| 4,093,851 | 6/1978 | Paulinski | 235/302.2 |

*Primary Examiner*—Raulfe B. Zache
*Attorney, Agent, or Firm*—Walter J. Madden, Jr.

[57] ABSTRACT

Means are provided to prevent the failure of an Initial Program Load (IPL) command in a data processing system because of a "busy" indication from a Direct Access Storage Device (DASD) control device which is executing the command. An IPL operation from a Central Processing Unit (CPU) involves the issuance of a System Reset signal to all channels and control units connected to the CPU, followed a short time later by a READ IPL command to the DASD control device controlling the DAS device which contains the program to be loaded. The present invention enables the system to distinguish between when a control device is busy with a System Reset procedure and when it is busy on other matters, and to permit the queueing of the READ IPL command when the control unit is busy and there is a System Reset operation pending so that the READ IPL command will not be rejected.

6 Claims, 5 Drawing Figures

PREVENTING INITIAL PROGRAM LOAD FAILURES

DESCRIPTION

TECHNICAL FIELD

This invention relates to methods and apparatus for controlling the transfer of data between a Central Processing Unit (CPU) and a Direct Access Storage Device (DASD), and relates more particularly to such methods and apparatus for use during a reloading of programming stored on DASD into the CPU.

BACKGROUND ART

The access of data on contemporary DASD units, such as disk files, has been accomplished through the use of a set of commands which direct the device to proceed to a specific geometric location and then process selected units of data found at that location. More specifically for example, in the IBM system 360 and System 370 CPU's, a CPU issues a series of commands, identified in 360/370 architecture as Channel Command Words (CCW's), which control the operation of the associated DASD.

The transfer of data between a 360/370 CPU and the accessed locations of storage devices utilizes a physical path connection involving a channel, a DASD control device communicating with the channel on one side in an asynchronous relationship and selected DAS devices on the other side. The operating system of the CPU initiates the transfer by a START I/O instruction, causing control to be relinquished to a series of CCW's. A sequence or chain of CCW's is then sent from the CPU over the channel to the control device for selecting and accessing the storage device as well as effectuating the data movement across the interface.

One operation commonly employed in computer systems of the type described above is known as "Initial Program Load" (IPL). This is an operation carried out by a CPU which involves reloading of the Initial Program from DAS devices into the CPU, and is invoked under a number of circumstances, such as when a power failure has caused the loss of the CPU programming stored in the CPU main memory or when the system is started. The procedure may be initiated by an operator pushing the "IPL" button on the CPU console. This causes each channel connected to that CPU to issue a System Reset signal to all DASD control units connected to the channels.

At a predetermined time after issuance of System Reset (this interval is a minimum of one millisecond in the case of System/370), the CPU causes an IPL START I/O to be issued to the channel addressed by the CPU console switches, and the channel in turn generates a "READ IPL" CCW and sends a START I/O signal to all attached DASD control units. If the control unit addressed by the READ IPL command has completed its action in response to the System Reset signals from the channels, the control unit will accept and execute the READ IPL command, reading the required stored information back through the control unit and channel to the CPU to enable the CPU to initiate the process of reloading its program.

However, if the control unit has not completed the operations required in response to the Systems Reset signal by the time the READ IPL command is issued, the control unit will appear "busy" when the READ IPL command arrives and the command will be rejected, thus aborting the READ IPL procedure. This same pattern will repeat itself upon subsequent depressions of the "IPL" command for the CPU, leaving the CPU unable to begin its operations.

This problem is created by the fact that when a control unit is available to more than one channel, the different channels vie with each other for usage of the control unit and once connected to a channel, the control unit is dedicated to that channel for the duration of the connection which exists to operate a DAS device or to retrieve status information from or relative to a device. When a channel issues a System Reset, this does not cause an active channel connection; instead, this causes a switch to be set in the channel interface logic of each control unit attached to that channel. Each control unit responds to the interface which has the system reset switch turned on in the same manner as it responds to the interface which has an active channel selection. The control unit is instantaneously dedicated to that channel interface for the duration of the System Reset sequence which exists to reset all information for that channel on all devices connected to that control unit. Thus, a control unit must treat the System Reset signals from the channels serially and unless it is able to serially complete its responses to the System Reset signals from all the channels to which it can be connected prior to the issuance of the READ IPL command, it will appear "busy" to this command and the command will fail to execute.

Further information about this type of operation between a channel and control unit is contained in the publication "IBM System 360 and System 370 I/O Interface Channel to Control Unit, Original Equipment Manufacturer's Information", IBM Publication No. GA22-6974, and in "IBM System/370 Principles of Operation", IBM Publication No. GA22-7000.

PRIOR ART

In Waddell, U.S. Pat. No. 3,716,837, each CPU channel in a multi CPU environment is to be considered as a logically independent processor with the capability of servicing only one REQUEST IN at a time and no ability to queue multiple simultaneous REQUESTS IN. Waddell's solution to the problem of multiple REQUESTS IN from plural control units polling the status of the same device is to have each control unit responsive to a "device available" signal, and complete the CPU-device path connection only if the device is not otherwise busy. If the device is busy, then the control unit notifies the CPU so that no action need be taken to the request for service from that control unit.

In contrast, the present invention is directed to a system reset occurring over a pair of channels terminating in the same control unit either from the same or different CPU's. This might involve the locking out of a second channel, since the control unit responsive to an IPL CCW on a first channel would present "busy" control unit status to the second channel. Since the CPU in SYSTEM RESET has no program running, it therefore has no facility for queueing a "control unit busy" indication.

The solution to the concurrent appearance of two or more SYSTEM RESETS at a single control unit involves having the control unit ascertain that it is the recipient of a SYSTEM RESET and queue its processing of the associated IPL CCW. The solution takes advantage of the control unit capability to set one or more latches indicative of a specialized queue of CCW's from diverse channels.

N'Guyen, U.S. Pat. No. 4,079,448, relates to the use of a control unit terminating a channel with plural speed I/O devices such that the control unit operates in a "master mode" so as to spatially and periodically distribute channel bandwidth for avoiding slow speed I/O device lock-out. This reference is distinguished in that it does not treat the same problem (concurrent SYSTEM RESETS) and it operates in a master rather than the slave mode of the system 370 configuration control unit.

Birchall, U.S. Pat. No. 4,040,021, relates to a method for adaptively allocating bandwidth as between sequences relating to overhead and telephone line switching functions in a CPU dedicated as a telephone central office. In contrast, in the present invention the key is control unit status recognition that it is processing at least one SYSTEM RESET and subsequent queueing of IPL CCW's rather than bandwidth allocation.

THE INVENTION

In accordance with the present invention, the interface between the channel attachment logic within the control unit and the control function is provided with means for distinguishing between whether the control unit is busy processing a System Reset or whether it is busy for one of many other reasons. In this manner, the system can act upon this information by inhibiting the "Control unit busy" indication to the channel when the control unit is busy processing a System Reset. As a result, the READ IPL command will not be turned away by a "Control unit busy" indication; instead, it will be held at the channel interface until the processing of the System Reset is complete. At that time, it will be accepted by the control unit and executed in the normal fashion.

BEST MODE

Figure 1:
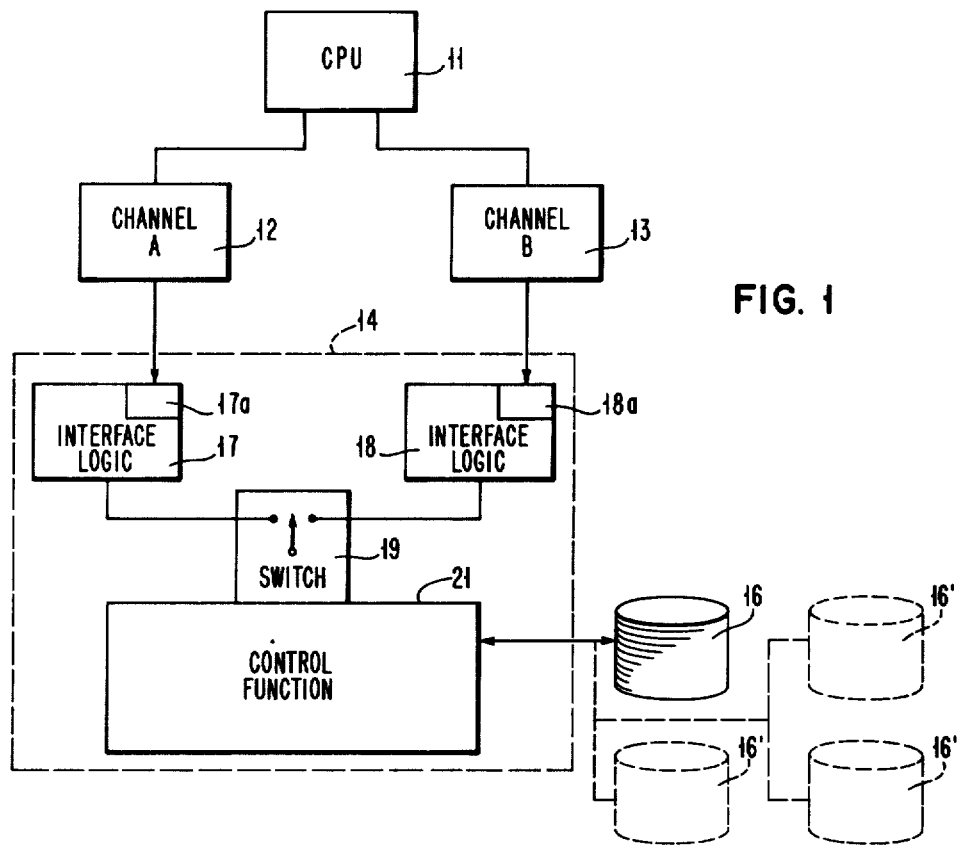
FIG. 1 is a block diagram representation of a system using the present invention.

Referring to FIG. 1, there is shown a system in which the present invention may be employed. The system includes at least one CPU 11 connected to two channels 12 and 13, labelled Channel A and Channel B, respectively. Channels 12, 13 are each connectable to a DAS control unit or control device device represented by the dotted outline 14. Control device 14 in turn controls one or more DAS devices 16, such as disk files. Control unit 14 is provided with channel interface circuitry for each attached channel, such as circuitry 17 for channel A and circuitry 18 for channel B. Control device 14 is provided with switch means, shown diagrammatically as 19, for controlling the connection of control device 14 to either channel A or channel B. As discussed above, control device 14 can be actively connected to only one channel at any one time.

Control device 14 also includes a portion 21 which performs the operations required to control the transfer of data between DAS devices 16 and CPU 11 through one or the other of channels 12, 13. As is well known, portion 21 may include a control store memory in which are stored microprograms for controlling the DAS operations, an Arithmetic and Logic Unit (ALU) for performing various arithmetic and logic operations, and various registers.

Figure 2:
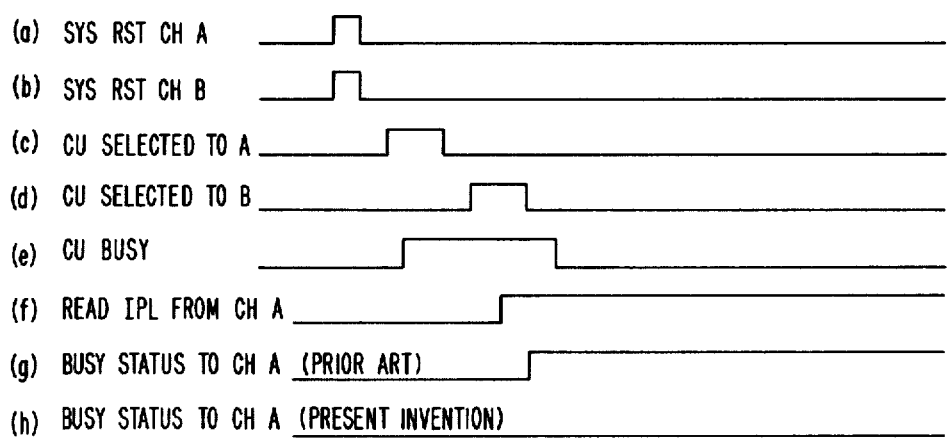
FIG. 2 is a timing diagram illustrating the operation of the invention.

In the usual operation, data is transferred between CPU 11 and DAS device 16 under the control of channels 12, 13 and control device 14. In the event of a requirement for a System Reset operation, which might occur after a power failure had caused the loss of all the programming in the memory of CPU 11, the operation is as follows. The purpose of a System Reset is to reload the memory of CPU 11 with its Initial Program Load, and the first step in this process is to read part of the program load from a DAS device 16. The System Reset operation may be initiated by the computer operator depressing the "IPL" button on the CPU console. This causes each channel connected to CPU 11 to issue a System Reset signal to each control device connected to the channel. This is shown by waveforms (a) and (b) of the timing diagram of FIG. 2, indicating that the System Reset outputs from channels A and B rise essentially simultaneously.

When a channel issues a System Reset signal, it causes a switch to be set in the channel interface logic of each control unit attached to that channel. This is shown as switch 17a of interface logic 17 for channel A, and switch 18a of interface logic 18 for channel B.

Control unit 14 then responds through switch 19 to one or the other of the System Reset signals. In the timing diagram of FIG. 2, it is assumed that device 14 first responds to the System Reset from channel A and switch 17a, as shown by waveform (c) of FIG. 2, with control unit 14 effectively selected to channel A. At this time, the "Control unit busy" line is raised, waveform (e), indicating to any channels other than channel A that control device 14 is unavailable. While control device 14 is effectively selected to channel A, all information relative to channel A which is on DAS devices 16 connected to control device 14 is reset, in accordance with the System Reset procedures.

Upon completion of these System Reset procedures for Channel A, control unit 14 is deselected from channel A, as shown by the drop in waveform (c). Control device 14 may then be selected to channel B through switch 19 and switch 18a, as represented by waveform (d) of FIG. 2. Control device 14 then proceeds to perform the reset procedures for all information relative to channel B on DAS devices 16. During the short interval between the end of the "control unit selected to channel A" signal, waveform (c), and the rise of the "control unit selected to channel B" signal, waveform (d), the "control unit busy" signal, waveform (e), remains up and does not drop because the control unit remains dedicated to the System Reset procedure. The "Control unit busy" signal thus remains up from the start of selection to channel A to the end of selection to channel B.

In the prior art, if the Read IPL command is issued by channel A, waveform (f), prior to the end of the "Control unit selected to channel B" signal and hence while the "Control unit busy" line is still up, control device 14 will return a "busy" status to channel A, thus causing the command to fail. Subsequent depression of the "IPL" button at the CPU console will cause continued failure of the System Reset procedure because of the inherent timing difficulties involved.

Figure 3:
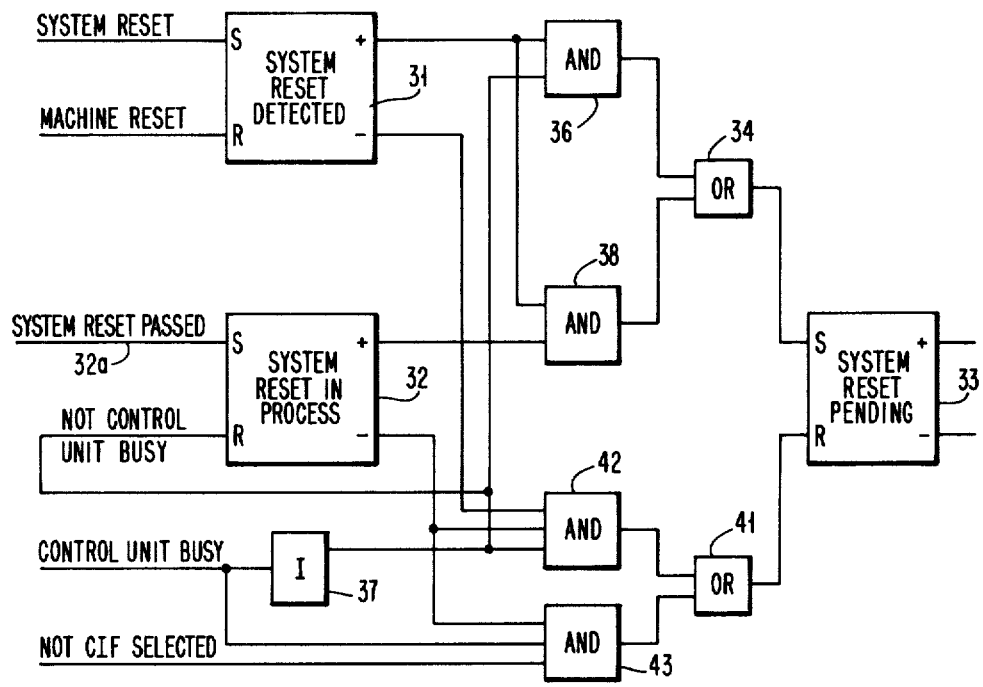
FIG. 3 is a logic diagram showing the implementation of the invention.
Figure 4:
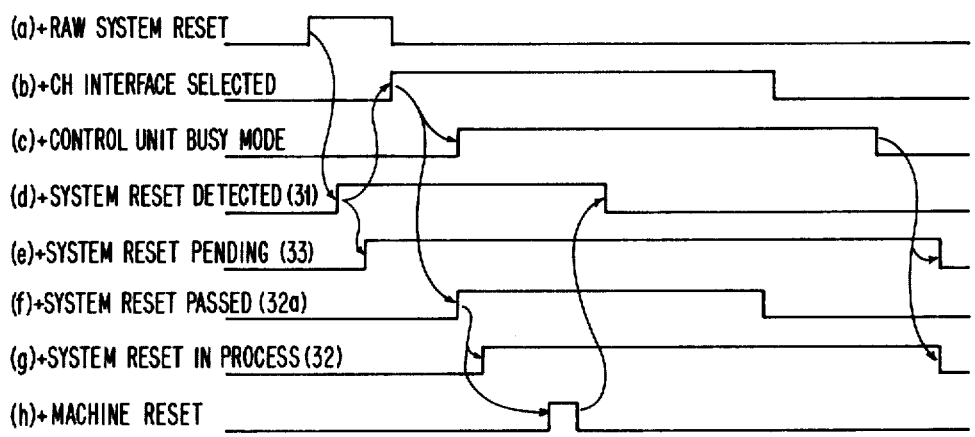
FIG. 4 is a timing diagram illustrating the operation of the circuit elements of FIG. 3.
Figure 5:
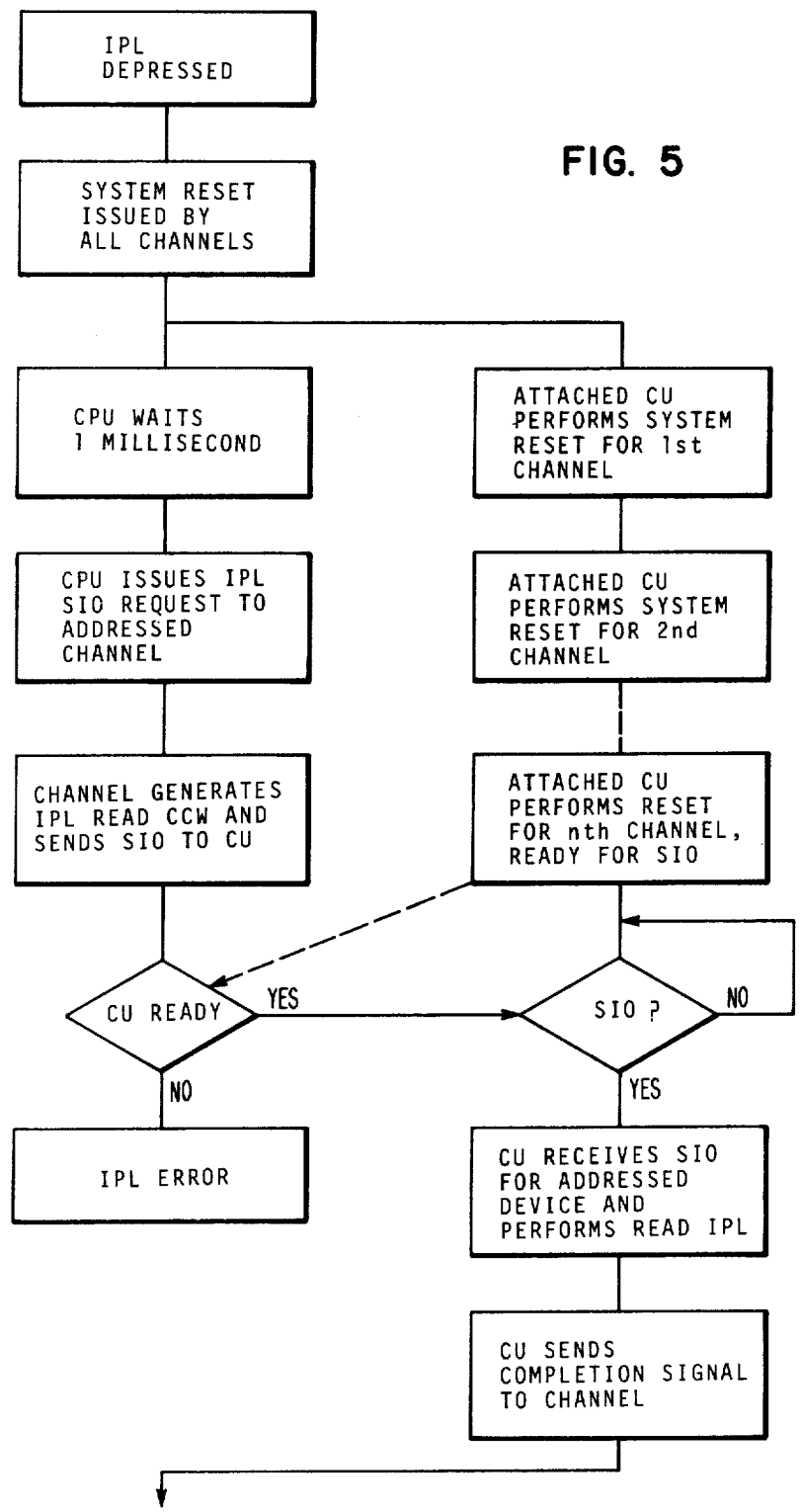
FIG. 5 is a flowchart showing the execution of an IPL operation.

The circuitry shown in FIG. 3 may be used in accordance with the present invention to prevent failure of the System Reset command as described above. The timing diagrams of FIG. 4 illustrate the operation of the circuitry of FIG. 3 when the control device is not busy at the time the System Reset is received. The circuitry includes a System Reset Detected latch 31 whose output, waveform (d), is set when a System Reset, waveform (a), is detected by the channel interface logic, and the output is reset when a Machine Reset, waveform (h), is issued by the maintenance logic of the system.

A "System Reset in Process" latch 32 is set, waveform (g), when the detected system reset output from latch 31 is passed to a register external to the circuitry shown in FIG. 3 and supplied as the set input to latch 32 on a line 32a, waveform (f). Latch 32 is reset when the "Control unit busy" line turns off at the end of the IPL sequence, waveform (c).

A "System Reset Pending" latch 33 is used to condition the channel interface logic to inhibit sending a "control unit busy" indication to the channel under certain conditions. Latch 33 receives a set input through an OR gate 34 having one input from an AND gate 36. AND gate 36 receives one input from the output of System Reset Detected latch 31 and another input from the inverted output of the "Control unit busy" signal through an inverter 37. AND gate 36 thus passes a signal through OR gate 34 to set latch 33, waveform (e), when the System Reset Detected output and the "Control unit not busy" signal are both present.

The set output of latch 33, representing that a System Reset is pending, is used to inhibit the "Control unit busy" indication to the associated channel during the pendency of a System Reset. Thus, as shown by waveform (h) of FIG. 2, with the present invention there is no "control unit busy" status presented to channel A during a System Reset procedure.

The System Reset Pending latch 33 is normally reset to remove the inhibiting of "Control Unit Busy" by a signal received through an OR gate 41 from an AND gate 42. The three inputs to gate 42 are the reset output of latch 31, the reset output of latch 32, which is reset by the "Control unit not busy" signal, and the inverted output from inverter 37 of the "Control unit busy" signal. When these three signals are present, latch 33 is reset.

The output of System Reset in Process latch 32 "ANDed" with the output of System Reset Detected latch 31, also causes the setting of the System Reset Pending latch 33 through AND gate 38 and OR gate 34. This method of setting the System Reset Pending latch is used when a System Reset is received by a control unit which is already indicating "Control unit busy", i.e., in a blocking situation. Blocking means that the control unit is only accepting Control unit initiated selections and blocks Channel initiated selections by raising "Control unit busy".

Latch 33 may also be reset as follows. An AND gate 43, which is connected through OR gate 41 to the reset of latch 33, receives the reset output of System Reset in Process latch 32, "CU Busy", and "not Channel interface (CIF) Selected". This method of resetting the System Reset Pending latch 33 is used in the case where the control device was not busy at the time the System Reset arrived, thus allowing the set of this latch, but the control device went busy immediately afterward with another interface for a non-System Reset function.

The operation of the present invention is as follows. When the Read IPL command arrives while the control unit is not busy, it will be immediately accepted and processed. This is what happens in a system in which only one channel connects the control unit to the IPLing host, since the system reset is always processed in less than one millisecond.

When the Read IPL command arrives while the control unit is busy processing a system reset, it is accepted immediately and held pending execution until after all system resets are processed. This is the situation which previously caused the IPL to fail.

When the Read IPL command arrives while the control unit is busy with another interface for a reason other than that of processing a system reset, then the IPL will fail. This failure is unavoidable and is not affected by this invention. However, the same instantaneous situation is unlikely to occur when the IPL button is depressed again.

We claim:

1. In a computer system in which a central processing unit communicates over channel devices through commands to a control device controlling direct access storage devices, said control device terminating two or more channel devices from the same or different central processing units, said central processing unit initiating an "initial program load" procedure under which a "system reset" signal is sent to said control device by each channel device connected to the central processing unit and connectable to said control device, followed by the issuance of a "read initial program load" command by one of said channel devices to said control device, said control device being capable of responding to only one of said channel devices at any one time and, when said control device is responding to one channel device, presenting a "control device busy" signal to all other channel devices, apparatus including;

means responsive to the initiation of a "system reset" procedure for generating a first signal, means responsive to a "not busy" condition of said control device for generating a second signal, means responsive to the joint existence of said first and said second signals for generating a "system reset pending" signal, and means responsive to said "system reset pending" signal for inhibiting the transmission of said "control device busy" signal to said channels.

2. Apparatus in accordance with claim 1, including means in said control device for queueing a "read initial program load" command which is received while said "system reset pending" signal is present.

3. Apparatus in accordance with claim 1, including means in said control device for terminating the generation of said "system reset pending" signal after execution of said "read initial program load" command by said control device.

4. Apparatus in accordance with claim 2, including means in said control device for executing said queued "read initial program load" command after said control device has processed all of said system reset signals.

5. Apparatus in accordance with claim 4, including means in said control device for terminating the generation of said "system reset pending" signal after execution of said "read initial program load" command by said control device.

6. In a computer system in which a central processing unit communicates over channel devices through commands to a control device controlling direct access storage devices, said control device terminating two or more channel devices from the same or different central processing units, said central processing unit initiating an "initial program load" procedure under which a "system reset" signal is sent to said control device by each channel device connected to the central processing unit and connectable to said control device, followed by the issuance of a "read initial program load" command by one of said channel devices to said control device, said control device being capable of responding to only one of said channel devices at any one time and, when said control device is responding to one channel device, presenting a "control device busy" signal to all other channel devices,
the method comprising the steps of determining when the control device is engaged in processing system reset signals from said channel devices, preventing the transmission of said "control device busy" signal to said channel devices when said control device is processing said system reset signals.

queueing a "read initial program load" command which is received while said control device is processing said system reset signals, and executing said queued "read initial program load" command upon completion of the processing of said system reset signals.

* * * * *